United States Patent
Liao et al.

(10) Patent No.: US 9,456,219 B2
(45) Date of Patent: Sep. 27, 2016

(54) IMAGE ENCODING SYSTEM AND IMAGE ENCODING METHOD

(75) Inventors: Duan-Li Liao, Taichung (TW); Chia-Chang Li, Pingtung (TW); Po-Lung Chen, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1377 days.

(21) Appl. No.: 13/242,372

(22) Filed: Sep. 23, 2011

(65) Prior Publication Data

US 2013/0028513 A1 Jan. 31, 2013

(30) Foreign Application Priority Data

Jul. 28, 2011 (TW) .............................. 100126876 A

(51) Int. Cl.
*G06K 9/00* (2006.01)
*H04N 19/597* (2014.01)
*H04N 13/00* (2006.01)

(52) U.S. Cl.
CPC ........ *H04N 19/597* (2014.11); *H04N 13/0048* (2013.01)

(58) Field of Classification Search
None
See application file for complete search history.

(56) References Cited

U.S. PATENT DOCUMENTS

| | | | |
|---|---|---|---|
| 6,215,898 B1* | 4/2001 | Woodfill ................. | G06K 9/32 348/47 |
| 6,348,918 B1 | 2/2002 | Szeliski et al. | |
| 7,035,451 B2 | 4/2006 | Harman et al. | |
| 7,451,317 B2* | 11/2008 | Oh .......................... | G06T 1/005 380/201 |
| 7,668,377 B2 | 2/2010 | Curti et al. | |
| 7,697,749 B2 | 4/2010 | Ogawa | |
| 8,643,643 B2* | 2/2014 | Li .......................... | G06T 7/0075 345/419 |
| 2004/0071311 A1* | 4/2004 | Choi ....................... | G06T 1/0071 382/100 |
| 2004/0109585 A1 | 6/2004 | Tao et al. | |
| 2010/0098326 A1* | 4/2010 | Abeloe .................. | H04N 21/235 382/154 |
| 2010/0142824 A1 | 6/2010 | Lu | |
| 2010/0321390 A1 | 12/2010 | Kim et al. | |
| 2011/0090318 A1 | 4/2011 | Chen et al. | |
| 2011/0141237 A1 | 6/2011 | Cheng et al. | |
| 2012/0008672 A1* | 1/2012 | Gaddy .................... | G06T 1/0028 375/240.01 |

(Continued)

FOREIGN PATENT DOCUMENTS

| | | |
|---|---|---|
| CN | 101605270 | 12/2009 |
| TW | 200843479 | 11/2008 |

(Continued)

OTHER PUBLICATIONS

English language translation of abstract of TW 200843479 (published Nov. 1, 2008).

(Continued)

*Primary Examiner* — Aaron W Carter
(74) *Attorney, Agent, or Firm* — McClure, Qualey & Rodack, LLP

(57) ABSTRACT

An image encoding system and an image encoding method are provided. The image encoding system comprises a relation computing unit and an embedded unit. The relation computing unit receives a plurality of view-angle images each comprising a plurality of pixels, and calculates a relative relationship between pixels according to their colors and locations of the pixels to generate a plurality of encoding images. The embedded unit respectively embeds the encoding images in the view-angle images to generate a plurality of embedded images.

10 Claims, 9 Drawing Sheets

(56) References Cited

U.S. PATENT DOCUMENTS

2013/0028513 A1* 1/2013 Liao .................. H04N 19/597
   382/166
2015/0237323 A1* 8/2015 Du .................... H04N 13/0011
   348/43

FOREIGN PATENT DOCUMENTS

TW   201006236      2/2010
TW   201114244 A    4/2011

OTHER PUBLICATIONS

English language translation of abstract of CN 101605270 (published Dec. 16. 2009).

English language translation of abstract of TW 201006236 (published Feb. 1, 2010).

Hirschmuller, H., et al.; "Accurate and Efficient Stereo Processing by Semi-Global Matching and Mutual Information;" IEEE Conference on Computer Vision and Pattern Recognition (CVPR); Jun. 2005; pp. 1-8.

Tombari, F., et al.; "Near Real-Time Stereo Based on Effective Cost Aggregation;" pp. 1-4, 2008.

Bleyer, M., et al.; "A Layered Stereo Algorithm Using Image Segmentation and Global Visibility Constraints;" pp. 1-4, 2005.

Birchfield, S., et al.; "Depth Discontinuities by Pixel-to-Pixel Stereo;" IEEE International Conference on Computer Vision; 1998; pp. 1-8.

TW Office Action dated Dec. 1, 2014.

* cited by examiner

IMAGE ENCODING SYSTEM AND IMAGE ENCODING METHOD

This application claims the benefit of Taiwan application Serial No. 100126876, filed Jul. 28, 2011, the disclosure of which is incorporated by reference herein in its entirety.

BACKGROUND

1. Technical Field

The disclosed embodiments relate in general to an image encoding system and an image encoding method.

2. Description of the Related Art

The man-machine interface system, which is based on people's visual perception, mainly captures an image with a camera, detects the user's movement or gesture, and further interacts with the digital contents. The recognition rate achieved by the conventional interactive system, which employs only one single camera, is normally unsatisfactory due to the factors such as similar colors or background interference. The man-machine interface system, which employs dual cameras, creates a depth image through the calculation of the left and the right parallaxes, and effectively captures the image of the object close to the camera to avoid shadow interference. However, in the part of the depth image created through the calculation of the left and the right parallaxes, the depth of the texture-free region may not be determined if the information in the texture-free region of the original image is insufficient. To resolve the problem of having insufficient information in the texture-free region, a global method and a local method are provided. According to the global method, similar regions are marked by way of object segmentation, and depth computation is performed. According to the local method, more detailed information processing is performed to resolve the problem of having insufficient information in the texture-free region by way of cost aggregation. However, the two methods both require a large volume of computation.

SUMMARY

The disclosure is directed to an image encoding system and an image encoding method.

The present disclosure provides an image encoding system comprising a relation computing unit and an embedded unit. The relation computing unit receives a plurality of view-angle images captured by the image capturing device and calculates a relative relationship between pixels according to their colors and locations to generate a plurality of encoding images, wherein each view-angle image comprises a plurality of pixels. The embedded unit respectively embeds the encoding images in the view images view-angle image to generate a plurality of embedded images.

The present disclosure provides an image encoding system comprising a relation computing unit, an embedded unit and a depth computing unit. The relation computing unit receives a plurality of view-angle images captured by the image capturing device and calculates a relative relationship between pixels according to their colors and locations to generate a plurality of encoding images, wherein each view-angle image comprises a plurality of pixels. The embedded unit respectively embeds the encoding images in the view images view-angle image to generate a plurality of embedded images. The depth computing unit outputs a depth image according to the embedded images.

The present disclosure provides an image encoding method comprising: receiving a plurality of view-angle images each comprising a plurality of pixels; calculating a relative relationship between pixels according to their colors and locations to generate a plurality of encoding images; respectively embedding the encoding images are in the view images view-angle image to generate a plurality of embedded images.

The present disclosure provides an image encoding method comprising: receiving a plurality of view-angle images each comprising a plurality of pixels; calculating a relative relationship between pixels according to their colors and locations to generate a plurality of encoding images; respectively embedding the encoding images are in the view images view-angle image to generate a plurality of embedded images; and outputting a depth image according to the embedded images.

The above and other aspects of the invention will become better understood with regard to the following detailed description of the preferred but non-limiting embodiment(s). The following description is made with reference to the accompanying drawings.

Figure 1:
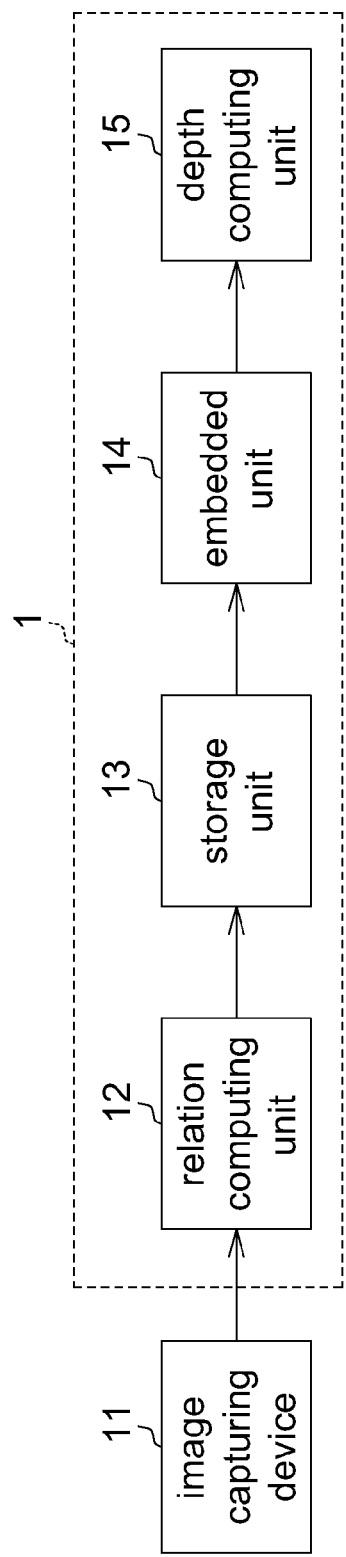
FIG. 1 shows an image encoding system according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

Figure 2:
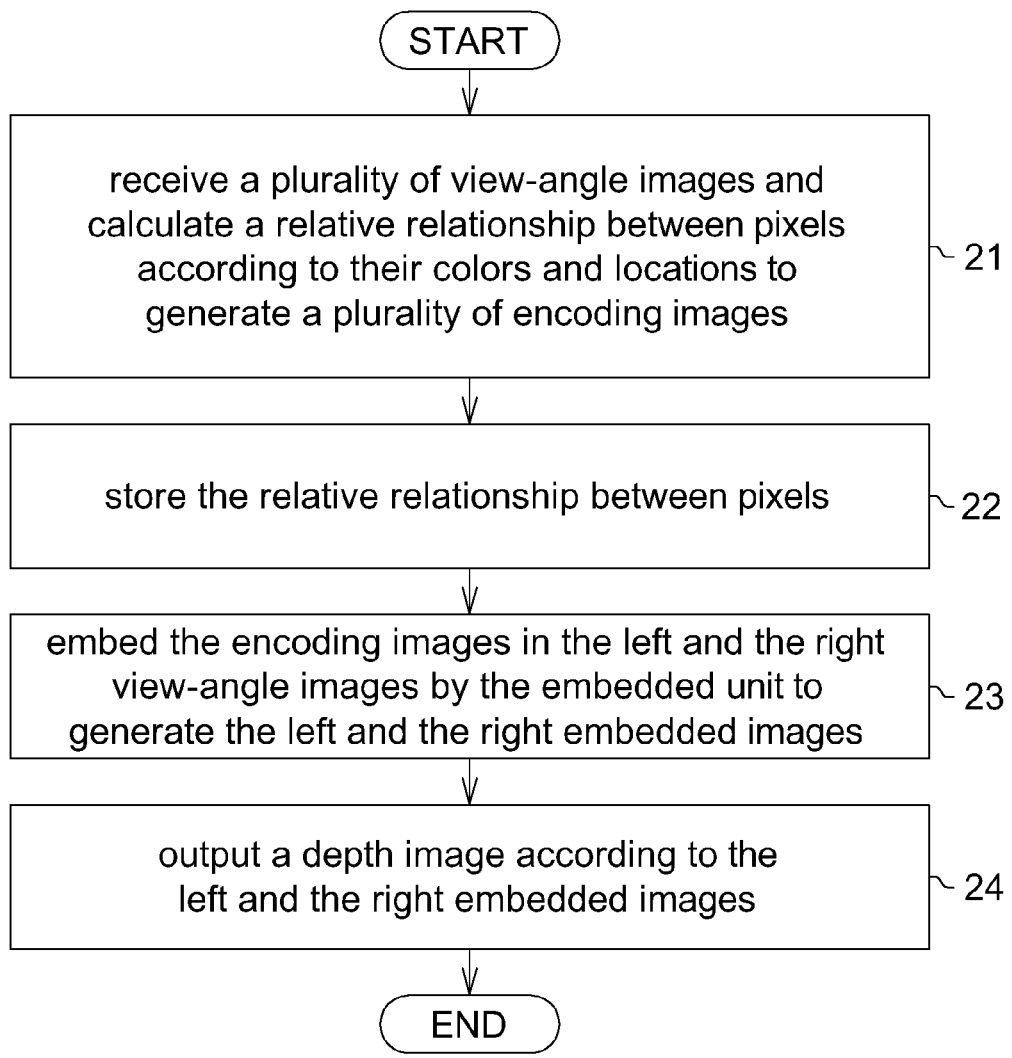
FIG. 2 shows an image encoding method according to a first embodiment.

Referring to FIG. 1 and FIG. 2, FIG. 1 shows an image encoding system according to a first embodiment, and FIG. 2 shows an image encoding method according to a first embodiment. The image encoding system 1 comprises a relation computing unit 12, a storage unit 13, an embedded unit 14 and a depth computing unit 15. The image encoding method comprises steps 21~24. In step 21, the relation computing unit 12 receives a plurality of view-angle images, such as the left and the right view-angle images captured by the image capturing device 11, and calculates a relative relationship between pixels according to their colors and locations to generate a plurality of encoding images, wherein each view-angle image comprises a plurality of pixels. The image capturing device 11 is realized by such as dual cameras, and the left and the right view-angle images respectively comprise a plurality of pixels. In an embodiment, such as step 22, the relative relationship between pixels is stored to the storage unit 13.

In step 23, the encoding images are embedded in the left and the right view-angle images by the embedded unit 14 to generate the left and the right embedded images. Since the encoding images are embedded in the left and the right view-angle images, the left and the right embedded images possess significant characteristics even in the texture-free region. The encoding images can be embedded in the left and the right view-angle images through different implementations. For example, each of the left and the right view-angle images comprises a red channel, a green channel and a blue channel. The embedded unit 14 embeds the encoding images in one of the red channel, the green channel and the blue channel of the left and the right view-angle images. Besides, each of the left and the right view-angle images may comprise a red channel, a green channel, a blue channel and an encoding image channel. The embedded unit 14 embeds the encoding images in the encoding image channel. Furthermore, each of the left and the right view-angle images comprise a gray level channel and an encoding image channel. The left and the right view-angle images can respectively be converted into a gray level image from a color image, then the embedded unit 14 respectively embeds the gray level image and the encoding images in the view images gray level channel and the encoding image channel to generate the left and right embedded images. In an embodiment, such as step 24, a depth image is further outputted by the depth computing unit 15 according to the left and the right embedded images.

Figure 3A:
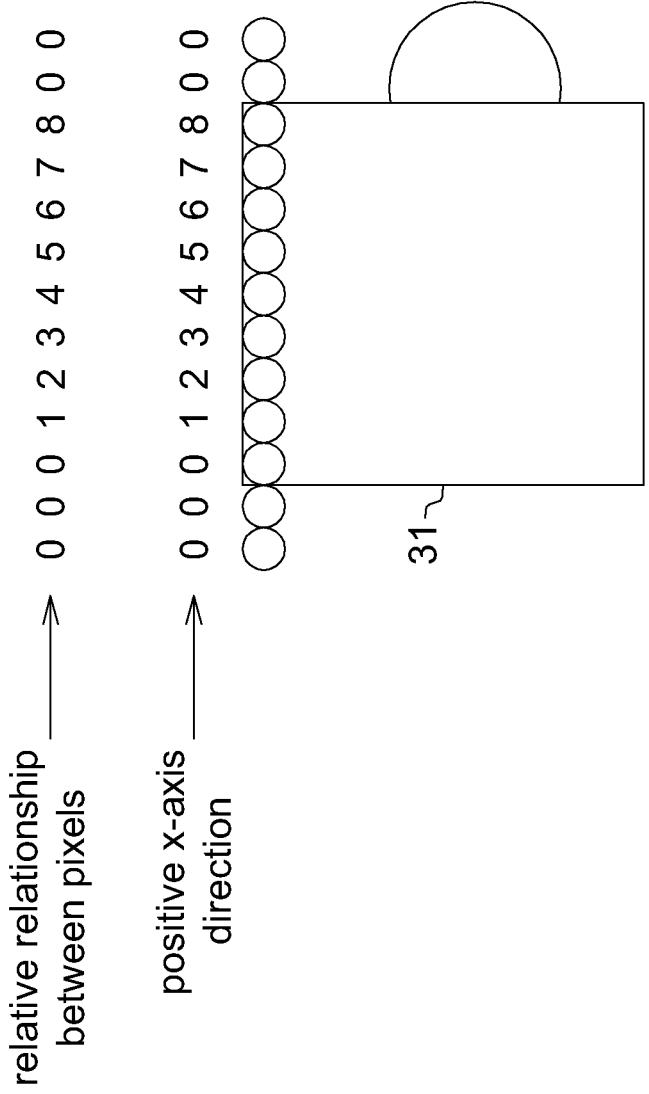
FIG. 3A shows a partial diagram of a relative relationship of the left view-angle image according to a first embodiment.
Figure 3B:
FIG. 3B shows a partial diagram of a relative relationship of the right view-angle image according to a first embodiment.
Figure 6:
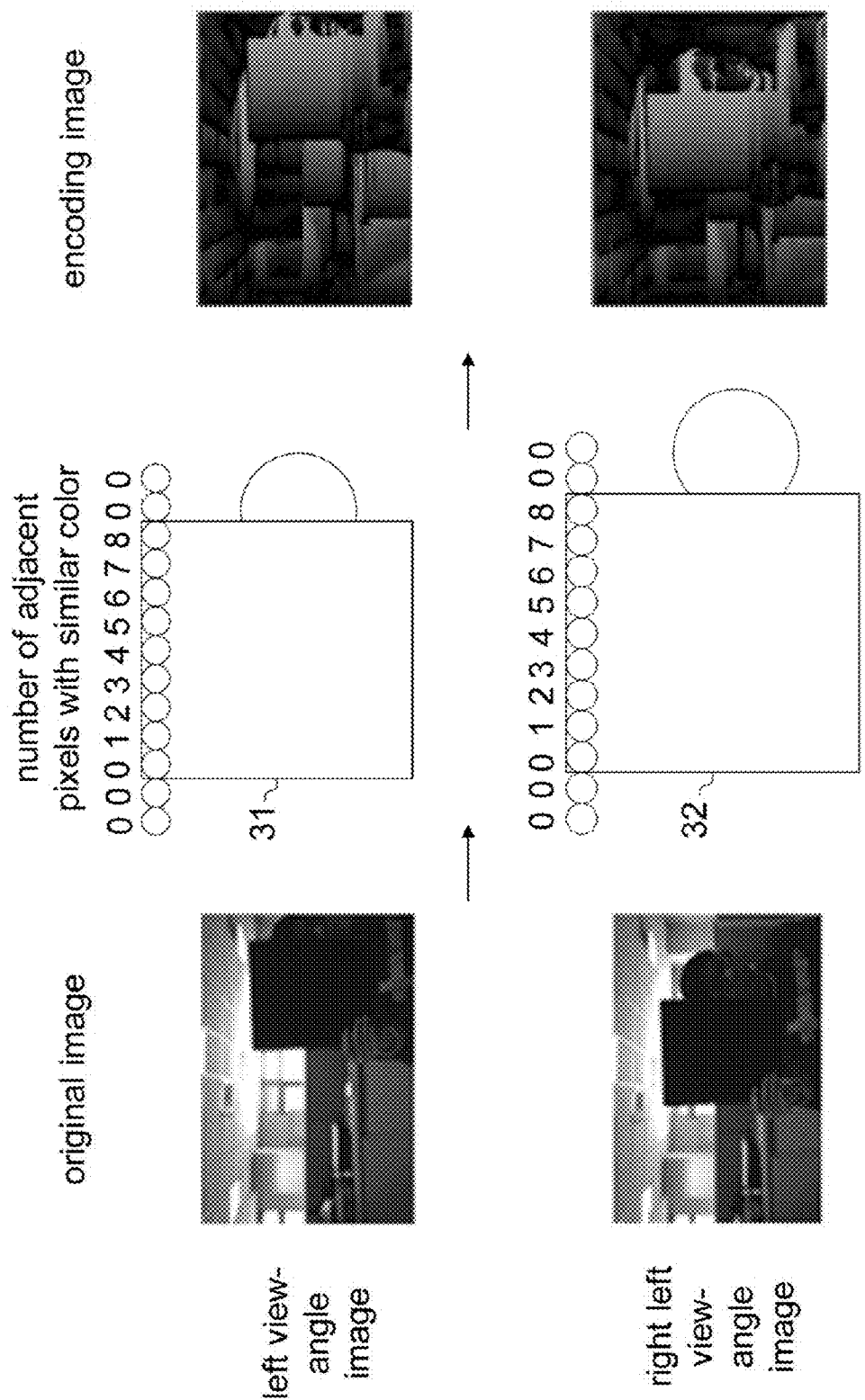
FIG. 6 is a diagram containing photographic images illustrating encoding images generated according to the number of adjacent pixels with similar color.

Referring to FIG. 3A and FIG. 3B, FIG. 3A shows a partial diagram of a relative relationship of the left view-angle image according to a first embodiment, and FIG. 3B shows a partial diagram of a relative relationship of the right view-angle image according to a first embodiment. The relative relationship between pixels can be calculated through different implementations. For example, the relation computing unit 12 calculates the relative relationship $N_{x,y}$ between pixels according to each pixel (x, y) of the left and the right view-angle images and the number $Nx^+_{x,y}$ of its adjacent pixels with similar color. In the first embodiment, the relation computing unit 12 calculates each pixel (x, y) of the left and the right view-angle images and the number $Nx^+_{x,y}$ of its adjacent pixels with similar color along a positive x-axis direction, and the relative relationship $N_{x,y}$ between pixels is equal to the number $Nx^+_{x,y}$ of adjacent pixels. The number of adjacent pixels with similar color are determined according to the left and the right view-angle images, and the encoding images are generated according to the number of adjacent pixels with similar color (as shown in FIG. 6).

The number of adjacent pixels is expressed as:

$$Nx^+_{x,y} = \begin{cases} Nx^+_{x-1,y} + 1 & \text{if } |C(x,y) - C(x-1,y)| < Th \\ 0 & \text{otherwise.} \end{cases}$$

The calculation for determining whether the color of adjacent pixels is similar is expressed as: $|C(x,y)-C(x-1,y)|= |R_{x,y}-R_{x-1,y}|+|G_{x,y}-G_{x-1,y}|+|B_{x,y}-B_{x-1,y}|$. Wherein, $R_{x,y}$, $G_{x,y}$ and $B_{x,y}$ respectively denote a red pixel value, a green pixel value and a blue pixel value of the pixel (x,y), and $R_{x-1,y}$, $G_{x-1,y}$ and $B_{x-1,y}$ respectively denote a red pixel value, a green pixel value and a blue pixel value of the pixel (x−1,y). If each pixel (x,y) of the left view-angle image is replaced by the relative relationship $N_{x,y}$ between pixels, then the diagram of relative relationship between pixels of the left view-angle image can be obtained. Likewise if each pixel (x,y) of the right view-angle image is replaced by the relative relationship $N_{x,y}$ between pixels, then the diagram of relative relationship between pixels of the right view-angle image can be obtained. In an embodiment, the diagram of pixel relative relationship between pixels is an encoding image.

In FIG. 3A, since the colors of all pixels in the texture-free region 31 are similar, the relative relationship $N_{x,y}$ between pixels of the left view-angle image calculated by the relation computing unit 12 along the positive x-axis direction is expressed as 0, 0, 0, 1, 2, 3, 4, 5, 6, 7, 8, 0 and 0 in order. Likewise, since the colors of all pixels in the texture-free region 32 are similar, the relative relationship $N_{x,y}$ between pixels of the right view-angle image calculated by the relation computing unit 12 along the positive x-axis direction is expressed as 0, 0, 0, 1, 2, 3, 4, 5, 6, 7, 8, 0 and 0 in order.

Second Embodiment

Figure 4A:
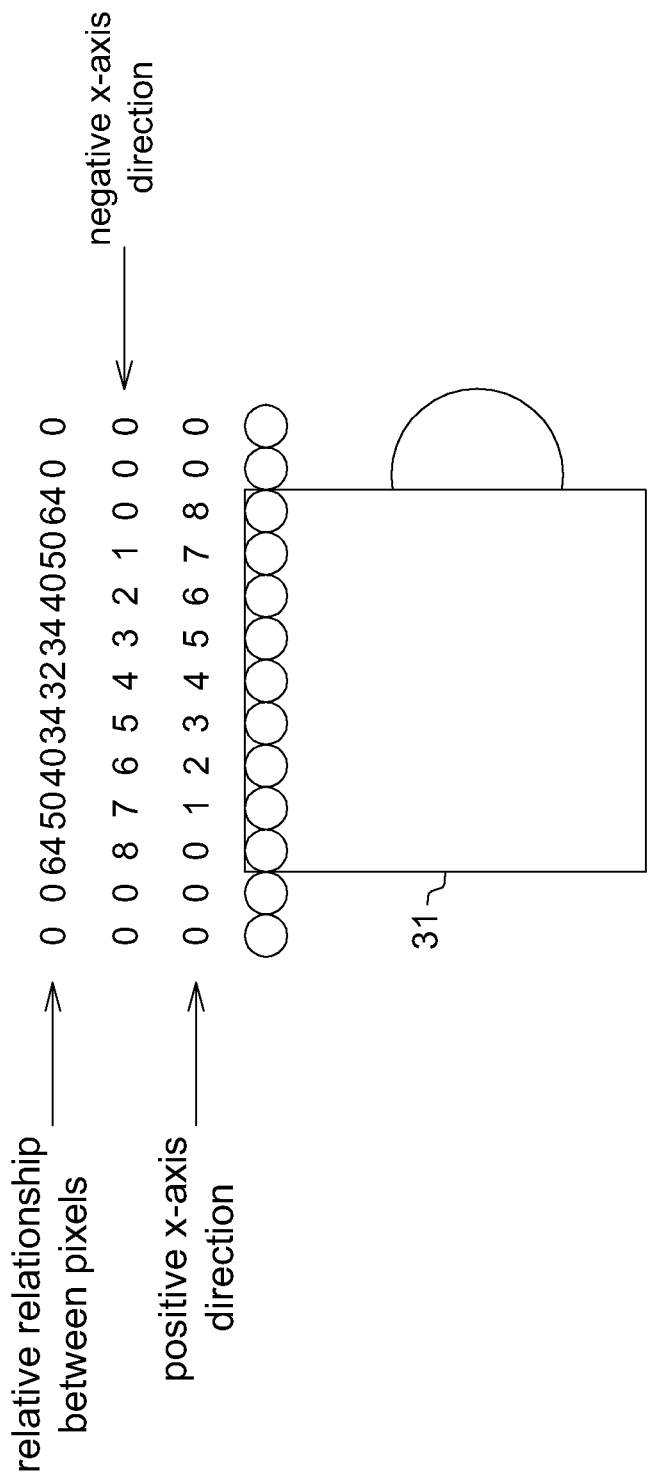
FIG. 4A shows a partial diagram of a relative relationship of the left view-angle image according to a second embodiment.
Figure 4B:
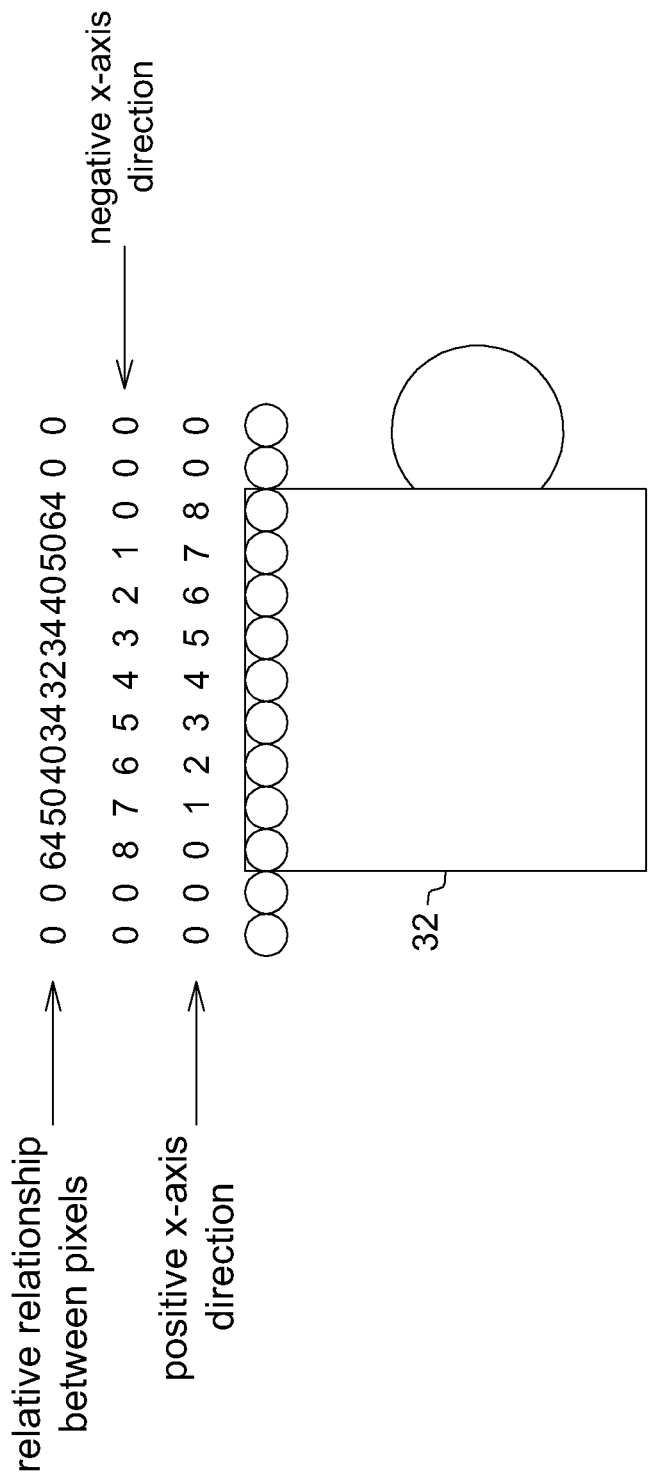
FIG. 4B shows a partial diagram of a relative relationship of the right view-angle image according to a second embodiment.

Referring to FIG. 4A and FIG. 4B, FIG. 4A shows a partial diagram of a relative relationship between pixels of the left view-angle image according to a second embodiment, and FIG. 4B shows a partial diagram of a pixel relative relationship between pixels of the right view-angle image according to a second embodiment. The relative relationship between pixels can be calculated through different implementations. For example, the relation computing unit 12 calculates each pixel (x,y) and the number $Nx^+_{x,y}$ of its adjacent pixels with similar color along a positive x-axis direction, calculates each pixel (x,y) and the number $Nx^-_{x,y}$ of its adjacent pixels with similar color along a negative x-axis direction opposite to the positive x-axis direction, and further calculates the relative relationship $N_{x,y}$ between pixels according to the square of the number $Nx^+_{x,y}$ of adjacent pixels and the square of the number $Nx^-_{x,y}$ of adjacent pixels. In the second embodiment, the relative relationship between pixels is expressed as $N_{x,y}=(Nx^+_{x,y})^2+(Nx^-_{x,y})^2$.

The number of adjacent pixels is expressed as:

$$Nx^+_{x,y} = \begin{cases} Nx^+_{x-1,y} + 1 & \text{if } |C(x,y) - C(x-1,y)| < Th \\ 0 & \text{otherwise.} \end{cases}$$

The calculation for determining whether the color of adjacent pixels is similar is expressed as: $|C(x,y)-C(x-1,y)|= |R_{x,y}-R_{x-1,y}|+|G_{x,y}-G_{x-1,y}|+|B_{x,y}-B_{x-1,y}|$. Wherein, $R_{x,y}$, $G_{x,y}$ and $B_{x,y}$ respectively denote a red pixel value, a green pixel value and a blue pixel value of the pixel (x,y), and $R_{x-1,y}$, $G_{x-1,y}$ and $B_{x-1,y}$ respectively denote a red pixel value, a green pixel value and a blue pixel value of the of the pixel (x−1,y).

The number of adjacent pixels is expressed as:

$$Nx_{x,y}^- = \begin{cases} Nx_{x-1,y}^- + 1 & \text{if } |C(x,y) - C(x-1,y)| < Th \\ 0 & \text{otherwise.} \end{cases}$$

The calculation for determining whether the color of adjacent pixels is similar is expressed as: $|C(x,y)-C(x-1,y)| = |R_{x,y}-R_{x-1,y}| + |G_{x,y}-G_{x-1,y}| + |B_{x,y}-B_{x-1,y}|$. Wherein, $R_{x,y}$, $G_{x,y}$ and $B_{x,y}$ respectively denote a red pixel value, a green pixel value and a blue pixel value of the pixel (x,y), and $R_{x-1,y}$, $G_{x-1,y}$ and $B_{x-1,y}$ respectively denote a red pixel value, a green pixel value and a blue pixel value of the pixel (x-1,y). If each pixel (x,y) of the left view-angle image is replaced by the relative relationship $N_{x,y}$ between pixels, then the diagram of relative relationship between pixels of the left view-angle image can be obtained. Likewise, if each pixel (x,y) of the right view-angle image is replaced by the relative relationship $N_{x,y}$ between pixels, then the diagram of relative relationship between pixels of the right view-angle image can be obtained.

In FIG. 4A, since the colors of all pixels in the texture-free region 31 are similar, the number $Nx^+_{x,y}$ of adjacent pixels of the left view-angle image calculated by the relation computing unit 12 along a positive x-axis direction is expressed as 0, 0, 0, 1, 2, 3, 4, 5, 6, 7, 8, 0 and 0 in order, and the number $Nx^-_{x,y}$ between pixels of the right view-angle image calculated by the relation computing unit 12 along a negative x-axis direction is expressed as 0, 0, 0, 1, 2, 3, 4, 5, 6, 7, 8, 0 and 0. In the second embodiment, since the relative relationship between pixels is expressed as: $N_{x,y} = (Nx^+_{x,y})^2 + (Nx^-_{x,y})^2$, the relative relationship $N_{x,y}$ between pixels along a positive x-axis direction is expressed as 0, 0, 64, 50, 40, 34, 32, 34, 40, 50, 64, 0 and 0 in order.

In FIG. 4B, since the colors of all pixels in the texture-free region 32 are similar, the number $Nx^+_{x,y}$ of adjacent pixels of the right view-angle image calculated by the relation computing unit 12 along a positive x-axis direction is expressed as 0, 0, 0, 1, 2, 3, 4, 5, 6, 7, 8, 0 and 0 in order, and the number $Nx^-_{x,y}$ of adjacent pixels of the right view-angle image calculated by the relation computing unit 12 along a negative x-axis direction is expressed as 0, 0, 0, 1, 2, 3, 4, 5, 6, 7, 8, 0 and 0 in order. In the second embodiment, since the relative relationship between pixels is expressed as $N_{x,y} = (Nx^+_{x,y})^2 + (Nx^-_{x,y})^2$, the relative relationship $N_{x,y}$ between pixels along a positive x-axis direction is expressed as 0, 0, 64, 50, 40, 34, 32, 34, 40, 50, 64, 0 and 0 in order.

When the relative relationship $N_{x,y}$ between pixels is larger than a gray level upper limit, the relation computing unit 12 further performs normalization on the relative relationship $N_{x,y}$ between pixels to obtain a relative relationship between normalized pixels. For example, the gray level upper limit is 255, and the relative relationship between normalized pixels is expressed as is expressed as: $N_{x,y} = ((Nx^+_{x,y})^2 + (Nx^-_{x,y})^2) * 255/N_{max}$. Wherein, $N_{max} = 2 \times W^2$, and W denotes image width. In an embodiment, the diagram of relative relationship between normalized pixels is an encoding image.

Third Embodiment

Figure 5A:
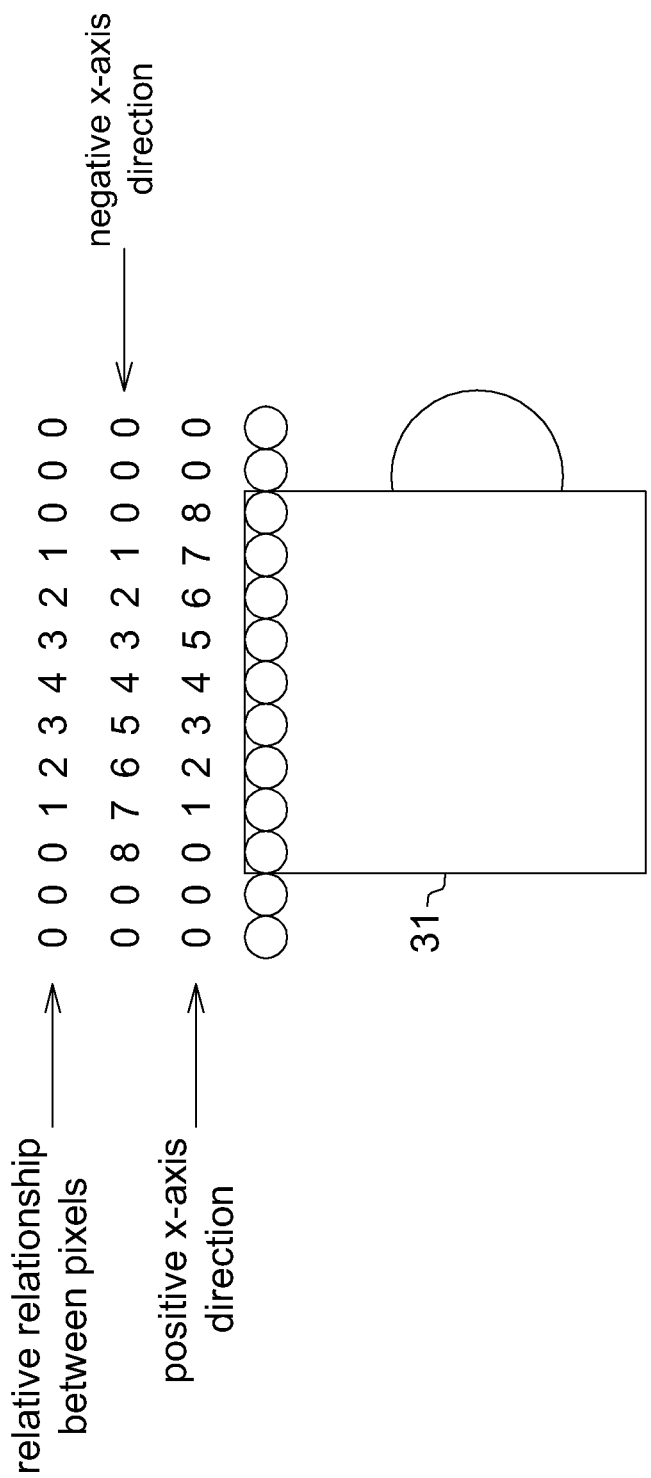
FIG. 5A shows a partial diagram of a relative relationship of the left view-angle image according to a third embodiment.
Figure 5B:
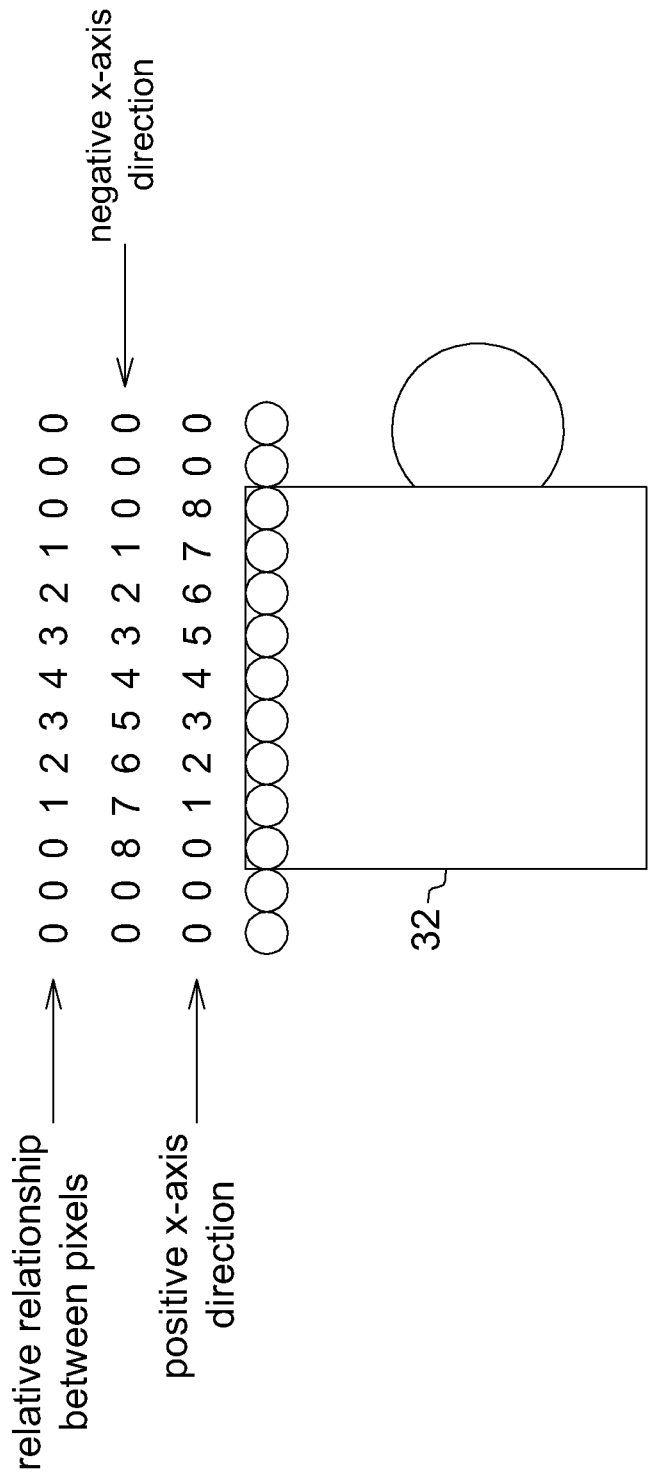
FIG. 5B shows a partial diagram of a relative relationship of the right view-angle image according to a third embodiment.

Referring to FIG. 5A and FIG. 5B, FIG. 5A shows a partial diagram of a relative relationship between pixels of the left view-angle image according to a third embodiment, and FIG. 5B shows a partial diagram of a relative relationship between pixels of the right view-angle image according to a third embodiment. The relative relationship between pixels can be calculated through different implementations. For example, the relation computing unit 12 calculates each pixel (x,y) and the number $Nx^+_{x,y}$ of its adjacent pixels with similar color along a positive x-axis direction, and calculates each pixel (x,y) and the number $Nx^-_{x,y}$ of its adjacent pixels with similar color along a negative x-axis direction opposite to the positive x-axis direction, and further calculates a relative relationship $N_{x,y}$ between pixels according to the minimum of the number $Nx^+_{x,y}$ of adjacent pixels and the number $Nx^-_{x,y}$ of adjacent pixels. In the third embodiment, the relative relationship between pixels is expressed as $N_{x,y} = Min(Nx^+_{x,y}, Nx^-_{x,y})$.

The number of adjacent pixels is expressed as $$Nx_{x,y}^+ = \begin{cases} Nx_{x-1,y}^+ + 1 & \text{if } |C(x,y) - C(x-1,y)| < Th \\ 0 & \text{otherwise.} \end{cases}$$

The calculation for determining whether the color of adjacent pixels is similar is expressed as: $|C(x,y)-C(x-1,y)| = |R_{x,y}-R_{x-1,y}| + |G_{x,y}-G_{x-1,y}| + |B_{x,y}-B_{x-1,y}|$. Wherein, $R_{x,y}$, $G_{x,y}$ and $B_{x,y}$ respectively denote a red pixel value, a green pixel value and a blue pixel value of the pixel (x,y), and $R_{x-1,y}$, $G_{x-1,y}$ and $B_{x-1,y}$ a red pixel value, a green pixel value and a blue pixel value of the of the pixel pixels (x-1,y).

The number of adjacent pixels is expressed as:

$$Nx_{x,y}^- = \begin{cases} Nx_{x-1,y}^- + 1 & \text{if } |C(x,y) - C(x-1,y)| < Th \\ 0 & \text{otherwise.} \end{cases}$$

The calculation for determining whether the color of adjacent pixels is similar is expressed as: $|C(x,y)-C(x-1,y)| = |R_{x,y}-R_{x-1,y}| + |G_{x,y}-G_{x-1,y}| + |B_{x,y}-B_{x-1,y}|$. Wherein, $R_{x,y}$, $G_{x,y}$ and $B_{x,y}$ respectively denote a red pixel value, a green pixel value and a blue pixel value of the pixel (x,y), and $R_{x-1,y}$, $G_{x-1,y}$ and $B_{x-1,y}$ respectively denote a red pixel value, a green pixel value and a blue pixel value of the pixel (x-1,y). If each pixel (x,y) of the left view-angle image is replaced by the relative relationship $N_{x,y}$ between pixels, then the diagram of relative relationship between pixels of the left view-angle image can be obtained. Likewise, if each pixel (x,y) of the right view-angle image is replaced by the relative relationship $N_{x,y}$ between pixels, then the diagram of relative relationship between pixels of the right view-angle image can be obtained.

In FIG. 5A, since the colors of all pixels in the texture-free region 31 are similar, the number $Nx^+_{x,y}$ of adjacent pixels of the left view-angle image calculated by the relation computing unit 12 along a positive x-axis direction is expressed as 0, 0, 0, 1, 2, 3, 4, 5, 6, 7, 8, 0 and 0, and the number $Nx^-_{x,y}$ of adjacent pixels of the right view-angle image calculated by the relation computing unit 12 along a negative x-axis direction is expressed as 0, 0, 0, 1, 2, 3, 4, 5, 6, 7, 8, 0 and 0. In the second embodiment, since the relative relationship between pixels is expressed as: $N_{x,y} = Min(Nx^+_{x,y}, Nx^-_{x,y})$, the relative relationship $N_{x,y}$ between pixels between pixels along a positive x-axis direction is expressed as 0, 0, 0, 1, 2, 3, 4, 3, 2, 1, 0, 0 and 0 in order.

In FIG. 5B, since the colors of all pixels in the texture-free region 32 are similar, the number $Nx^+_{x,y}$ of adjacent pixels of the right view-angle image calculated by the relation computing unit 12 along a positive x-axis direction is expressed as 0, 0, 0, 1, 2, 3, 4, 5, 6, 7, 8, 0 and 0 in order, and the number $Nx^-_{x,y}$ of adjacent pixels of the right view-angle image calculated by the relation computing unit 12 along a negative x-axis direction is expressed as 0, 0, 0, 1, 2, 3, 4, 5, 6, 7, 8, 0 and 0 in order. In the third embodiment, since the relative relationship between pixels is expressed as $N_{x,y}=Min(Nx^+_{x,y},Nx^-_{x,y})$, the relative relationship $N_{x,y}$ between pixels along a positive x-axis direction is expressed as 0, 0, 0, 1, 2, 3, 4, 3, 2, 1, 0, 0 and 0 in order.

When the relative relationship $N_{x,y}$ between pixels is larger than a gray level upper limit, the relation computing unit 12 further performs normalization on the relative relationship $N_{x,y}$ between pixels to obtain the relative relationship between normalized pixels. For example, the gray level upper limit is 255, and the relative relationship between normalized pixels is expressed as: $N_{x,y}=Min(Nx^+_{x,y},Nx^-_{x,y})*255/N_{max}$. Wherein, $N_{max}=W/2$, and W denotes image width. In an embodiment, the diagram of relative relationship between normalized pixels is an encoding image.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image encoding method, comprising:
   receiving a plurality of view-angle images each comprising a plurality of pixels;
   calculating a pixel relative relationship between the pixels according to their colors and locations to generate a plurality of encoding images; and
   respectively embedding the encoding images in the view-angle images to generate a plurality of embedded images;
   wherein in the calculation step, the relative relationship between pixels is calculated according to each said pixel and the number of its adjacent pixels with similar color, and the calculation step comprises:
   calculating each said pixel and a first number of its adjacent pixels with similar color along a first direction;
   calculating each said pixel and a second number of its adjacent pixels with similar color along a second direction opposite to the first direction; and
   calculating the relative relationship between pixels according to the square of the first number of adjacent pixels and the square of the second number of adjacent pixels.

2. The image encoding method according to claim 1, wherein when a sum of the square of the first number of adjacent pixels and the square of the second number of adjacent pixels is larger than a gray level upper limit, the sum is normalized.

3. The image encoding method according to claim 1, wherein each said view-angle image comprises a first color channel, a second color channel and a third color channel, and in the embedding step, one of the encoding images is embedded in the first color channel, the second color channel and the third color channel.

4. The image encoding method according to claim 1, wherein each said view-angle image comprises a first color channel, a second color channel, a third color channel and an encoding image channel, and in the embedding step, the encoding images are embedded in the encoding image channel.

5. The image encoding method according to claim 1, wherein each said view-angle image, being a gray level image, comprises a gray level channel and an encoding image channel, and in the embedding step, the gray level image and the encoding images are respectively embedded in the gray level channel and the encoding image channel.

6. The image encoding method according to claim 1, further comprising:
   capturing the view-angle images.

7. The image encoding method according to claim 1, further comprising:
   storing the relative relationship between pixels.

8. The image encoding method according to claim 1, further comprising:
   outputting a depth image according to the embedded images.

9. An image encoding method, comprising:
   receiving a plurality of view-angle images each comprising a plurality of pixels;
   calculating a pixel relative relationship between the pixels according to their colors and locations to generate a plurality of encoding images; and
   respectively embedding the encoding images in the view-angle images to generate a plurality of embedded images;
   wherein in the calculation step, the relative relationship between pixels is calculated according to each said pixel and the number of its adjacent pixels with similar color, and the calculation step comprises:
   calculating each said pixel and a first number of its adjacent pixels with similar color along a first direction;
   calculating each said pixel and a second number of its adjacent pixels with similar color along a second direction opposite to the first direction; and
   calculating the relative relationship between pixels according to a minimum of the first number of adjacent pixels and the second number of adjacent pixels.

10. The image encoding method according to claim 9, wherein when the minimum is larger than a gray level upper limit, the minimum is normalized.

* * * * *